United States Patent [19]

Lowrance

[11] 3,781,777
[45] Dec. 25, 1973

[54] APPARATUS FOR PROVIDING AN INDICATION OF THE DEPTH OF OBJECTS IN WATER

[75] Inventor: Darrell J. Lowrance, Tulsa, Okla.

[73] Assignee: Lowrance Electronics, Inc., Tulsa, Okla.

[22] Filed: Nov. 27, 1972

[21] Appl. No.: 309,685

Related U.S. Application Data

[63] Continuation of Ser. No. 137,421, April 26, 1971, abandoned.

[52] U.S. Cl. .............................................. 340/3 C
[51] Int. Cl. ............................ G01s 9/68, G01s 9/70
[58] Field of Search ..................... 340/3 C; 356/25; 250/233

[56] References Cited
UNITED STATES PATENTS 1,667,540  4/1928  Dorsey ............................... 340/3 C
2,437,608  3/1948  Long et al. ...................... 250/233 X
2,474,842  7/1949  Hayes ................................ 340/3 C
2,767,385  10/1956  Smith ................................ 340/3 C

FOREIGN PATENTS OR APPLICATIONS 875,057  8/1961  Great Britain ....................... 356/25

Primary Examiner—David Schonberg
Assistant Examiner—F. L. Evans
Attorney—Paul H. Johnson et al.

[57] ABSTRACT

Apparatus for providing an indication of angular position in response to indicating signals including a disc rotated at a constant rate, the disc being opaque and having a light passing slot adjacent the periphery, a stationary circumferential scale positioned adjacent the periphery of the disc having indications thereon, and a light source positioned rearwardly of the disc and arranged to direct the light on the circumferential portion of the disc when energized by signals, a portion of the light passing through the slot in the disc.

1 Claim, 6 Drawing Figures

PATENTED DEC 25 1973          3,781,777

INVENTOR.
DARRELL J. LOWRANCE
BY
*Head & Johnson*
ATTORNEYS

INVENTOR.
DARRELL J. LOWRANCE
BY
Head & Johnson
ATTORNEYS 3,781,777

APPARATUS FOR PROVIDING AN INDICATION OF THE DEPTH OF OBJECTS IN WATER

This application is a continuation of application Ser. No. 137,421, filed on Apr. 26, 1971 Darrell J. Lowrance, Apparatus For Providing An Indication of Angular Position In Response To Indicating Signals, now abandoned.

BACKGROUND, SUMMARY AND OBJECTS OF THE INVENTION

The invention relates to an apparatus for providing an indication of angular position in response to indicating signals. Such angular position may be utilized, as an example, to indicate elapsed time. As a specific example the invention may be utilized for an instrument to be used for indicating the depth of water and the existence of fish beneath the surface of the water. The invention will be described as it specifically relates to such fish and depth indicating application, as an example of other uses to which the invention may be applied. As a fish or depth indicator functioning on the sonar principal, the instrument operates by indicating elapsed time between the transmission and receipt of a sound signal, thus, the instrument is an elapsed timing indicator. Another example of the application of the invention would be such as in a radio direction indicator.

The use of a rotating flashing light instrument for fish and depth indicating is well known. Rotating flashing and depth indicating instruments in use today typically include a small neon bulb located at the periphery of a rotating disc. By means of wiper contacts, or induction coupling, electrical energy is transmitted to the neon bulb which lights in response to applied signals. In the usual application the neon bulb is ignited when a sound pulse is transmitted and is again when reflections of the sound pulse are detected. The distance the disc rotates between the transmission and the receipt of the reflected sound pulses is an indication of the distance between the point of transmission and the reflecting surface, whether such reflecting surface is the bottom of the body of water or a fish located between the surface and the bottom. The distance rotated by the disc during this interim period is indicated in terms of depth, in feet or fathoms, by a scale positioned adjacent the periphery of the disc.

This presently practiced procedure functions completely satisfactorily, however, it does introduce some problems. As above mentioned the electrical energy necessary to fire or ignite the neon bulb carried on the disc must be coupled from stationary electronic equipment to the rotating disc. The most frequently used method of accomplishing this is the use of wiper rings and brushes. Such wiper rings cause noise to be generated as the disc rotates and can be a source of trouble if the resistence between the brushes and wiper rings is changed for any reason. In addition, the wiper rings impose a load on the motor rotating the disc and any variation of this load can cause a variation in the speed of the disc and thereby cause an inaccurate reading. Transformer type coupling arrangements require that the secondary of the transformer be a rotating member. Not only is the transformer coupling expensive but it also requires circuitry providing a higher energy power output to convey sufficient energy through the coupling transformer necessary to ignite the neon bulb.

This invention provides a means of achieving the advantages of the rotating disc type indicating apparatus while eliminating the problems attendant to coupling electrical energy to the disc.

It is an object of this invention to provide an indicating instrument including the use of a rotating disc, the periphery of the disc rotating adjacent a fixed scale, and including a slot in the disc and a stationary light source positioned rearwardly of the disc and arranged to direct light through the slot.

This general object, as well as more specific objects, will be fulfilled in the following description and claims taken in conjunction with the attached drawing.

DESCRIPTION OF VIEWS

DETAILED DESCRIPTION

Figure 1:
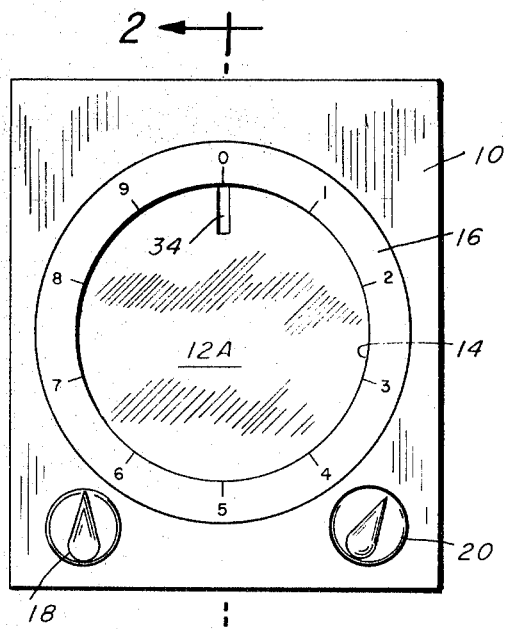
FIG. 1 is a front view of an instrument embodying principles of this invention.
Figure 3:
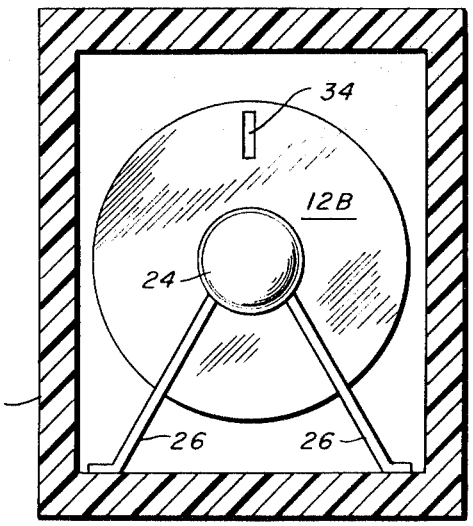
FIG. 3 is a cross-sectional view taken along the line 3—3 of FIG. 2.
Figure 2:
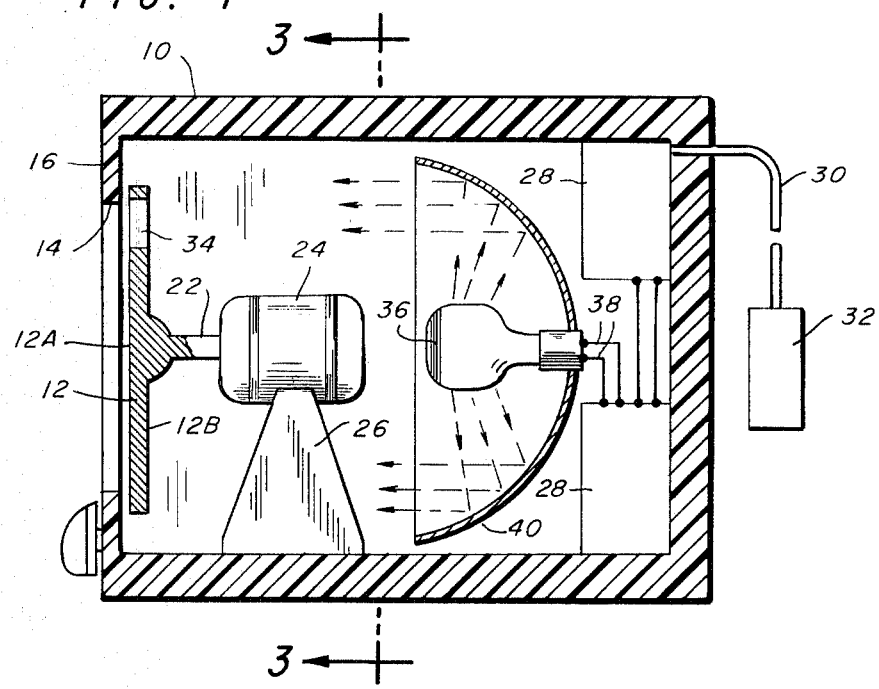
FIG. 2 is a cross-sectional view taken along the line 2—2 of FIG. 1.

As previously indicated, the invention will be described as it particularly relates to an instrument useful for indicating the depth of water and for the depth of fish below the surface of the water. Instruments of this type are well known and in common use today. Referring to FIGS. 1, 2 and 3, the instrument exemplifying the invention includes a housing 10. Within the housing is supported a rotating disc 12. An opening 14 is provided in the housing exposing the disc 12 to view. Around the circumference of opening 14 is provided an indicating scale 16. The instrument may include an on-off and range selection switch 18 and a sensitivity adjusting knob 20.

The disc 12 is rotated about its axis by means of a shaft 22 turned by a motor 24, the motor being supported by brackets 26 to the interior of the housing. The electronic apparatus 28 contained within the housing provides means of generating a time spaced sequence of electrical pulses which is applied to cable 30 to a probe 32. The probe is positioned beneath the surface of the water. In response to electrical pulses sound pulses are generated by the probe 32. Echoes are detected by probe 32 converted into electrical signals, and conveyed by cable 30 back to the circuitry 28. From the circuitry 28 electrical energy is applied to disc 12 to indicate receipt of echoes and thus indicate the time elapsed as the disc is rotated from the transmission of the sound pulse to the receipt of the echo. This serves as an indication of the distance from the probe to the surface which produces the echo. Such surface may be the bottom of the water in which the apparatus is being used or some object in between the surface and the bottom, such as fish.

The apparatus described up to this point is all well known in the art. As previously indicated the usual means of indicating the receipt of an echo by probe 32 is the application of electrical energy to a neon bulb (not shown) mounted on disc 12. This invention eliminates the need for the disc mounted neon bulb and provides an alternate arrangement for displaying indications to the user of the equipment.

A slot 34 is provided in disc 12, the slot being positioned at or adjacent to the outer periphery of the disc. A stationary light source, such as bulb 36 in FIG. 2, is positioned behind the rotating disc 12. For purposes of orientation, the disc 12 may be said to have an outer surface 12A and an inner surface 12B, the outer surface being seen by the user and the inner surface facing the interior of the housing 10. The disc 12 is of opaque material so that light from bulb 36 is not passed, except through slot 34. Thus, rather than in the presently used apparatus in which electrical energy is applied to a neon bulb affixed to a rotated disc 12, energy is applied from electronic apparatus, by way of conductor 38, to stationary bulb 36.

Bulb 36 is arranged so as to direct light on the rearward surface 12A of the disc and at least on the portions at and adjacent to the disc periphery, so that regardless of the rotative position of the disc when bulb 36 is ignited light passes through the slot 34 to give it indication of the disc position relative to scale 16.

Bulb 36 must be fast igniting and of low persistence, such as a neon or other gaseous discharged type bulbs. To assist in the proper direction of light from bulb 36 a reflector 40 may be provided, configured to concentrate the light onto the outer peripheral portion of disc 12.

It can be seen that the arrangement illustrated in FIGS. 1, 2 and 3 eliminates the requirement of coupling electrical energy from circuitry 28 to the totating disc 12. Thus no brushes are required nor is any type of energy coupling or transformer needed.

Figure 4:
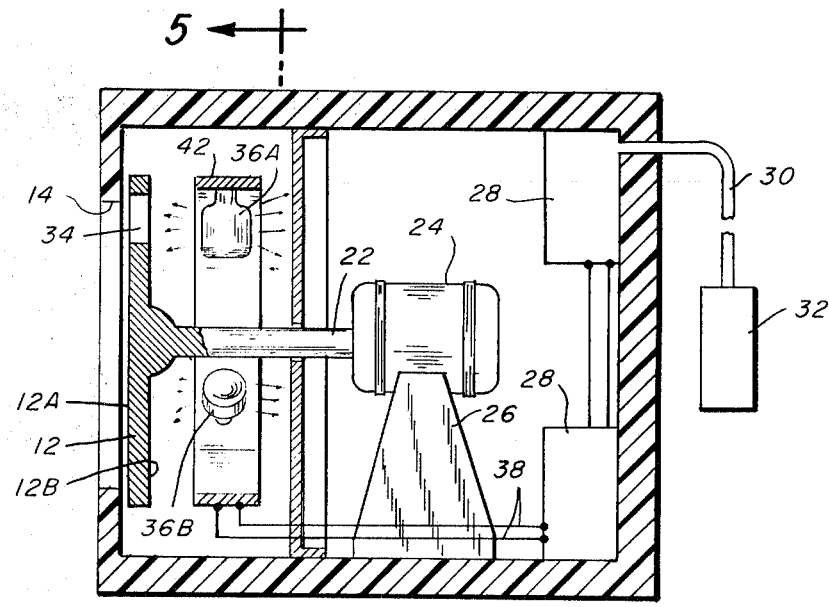
FIG. 4 is a cross-sectional view as shown in FIG. 2, but showing an alternate embodiment of the invention.
Figures 5, 6:
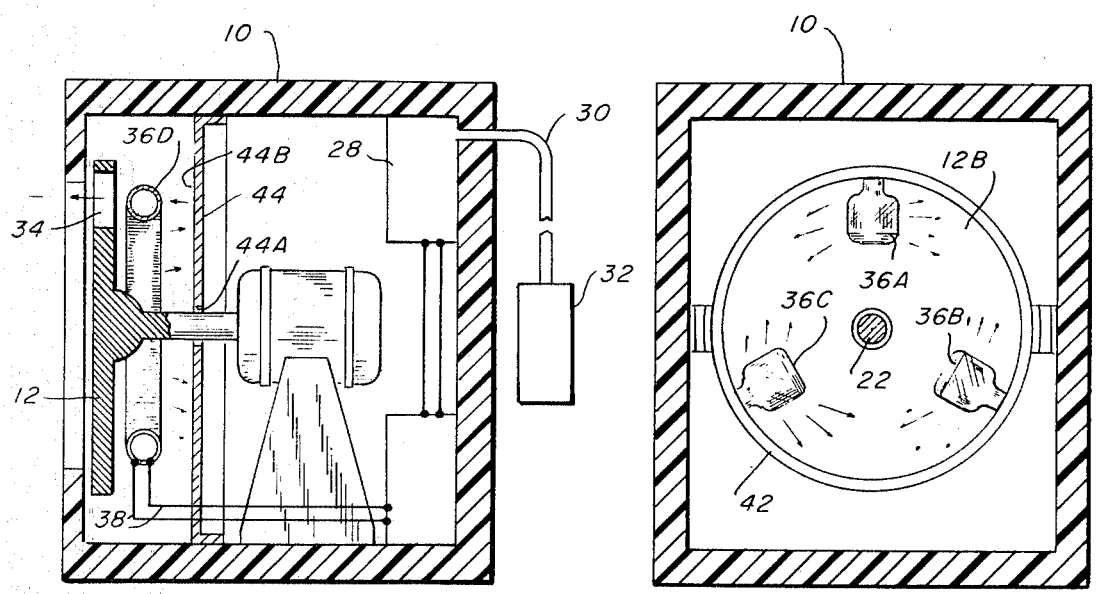
FIG. 5 is a cross-sectional view taken along the line 5—5 of FIG. 4.
FIG. 6 is a cross-sectional view as shown in FIG. 4., showing an alternate embodiment of the invention.

FIGS. 4 and 5 show an alternate arrangement of the invention. In this arrangement the light source is positioned between rearward surface 12B of the disc and motor 24. A plurality of light sources (in this case 3 in number) are positioned equally spaced around the shaft 22, the light bulbs being indicated by the numerals 36A, 36B and 36C. The bulbs 36A, 36B, and 36C are shown supported to a circumferential type bracket 42 supported within housing 10. It can be seen that a variety of different arrangements for the light source may be provided.

FIG. 6 shows an additional alternate arrangement for providing a light source. In this arrangement the light source 36D is in the form of a circle. The diameter of the circumferential light source 36D is preferably approximately equal to the diameter of the circle subscribed by the mid-point of slot 34 as disc 12 is rotated.

A partition 44 having an opening 44A therein to receive shaft 22 is provided. The partition may have a reflecting surface 44B to reflect light from light source 36B and intensify the amount of light passing through slot 34 when source 36D is energized.

The circuitry 28 utilized in the invention is not described since it is well known in the art and is currently used in depth and fish indicating apparatus on the commercial market. Reference may be had to U.S. Pat. No. 3,548,370 for information on sonar type depth indicating circuits.

While the invention has been described with a certain degree of particularity it is manifest that many changes may be made in the details of construction and the arrangement of components without departing from the spirit and scope of this disclosure. The invention is not to be limtied to the specific embodiments set forth herein for purposes of exemplification but only by the scope of the attached claim or claims, including the full range of equivalency to which each element or step thereof is entitled.

What is claimed:

1. An apparatus for providing an indication of the depth of objects in water in response to indicating signals, comprising a housing within which is:
   a disc rotated about its axis at a preselected constant rate, the disc having a forward and a rearward face, the disc being opaque to light and having a light passing slot therein adjacent the disc periphery, said disc rotated by an axially positioned electric motor rearward of said disc;
   a stationary circumferential scale positioned adjacent the forward face of said periphery of the disc; and
   a stationary light source positioned axially and rearwardly of said motor;
   a concave reflector circumferentially positioned about said light source positioned to direct light forwardly onto at least the outer circumferential portion of the rearward surface of said disc when the light source is energized, the portion of such light passing through said slot;
   means associated with such housing to transmit within said water sequence pulses toward said object and to receive reflected pulses therefrom;
   means to apply electrical energy to said light source as a function of said transmitted and reflected pulses whereby the location of the light passing through said slot relative to said scale provides an indication of the depth of said objects.

* * * * *